(12) United States Patent  
Karino et al.

(10) Patent No.: US 7,751,327 B2  
(45) Date of Patent: Jul. 6, 2010

(54) COMMUNICATION PROCESSING SYSTEM, PACKET PROCESSING LOAD BALANCING DEVICE AND PACKET PROCESSING LOAD BALANCING METHOD THEREFOR

(75) Inventors: Shuichi Karino, Tokyo (JP); Masahiro Jibiki, Tokyo (JP); Kazuya Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 1171 days.

(21) Appl. No.: 11/063,896

(22) Filed: Feb. 24, 2005

(65) Prior Publication Data

US 2005/0185646 A1 Aug. 25, 2005

(30) Foreign Application Priority Data

Feb. 25, 2004 (JP) ............................. 2004-048864

(51) Int. Cl.
*H04J 1/16* (2006.01)
(52) U.S. Cl. .................... 370/235; 370/242; 709/209
(58) Field of Classification Search ................ 370/218, 370/229–235, 216, 241, 242, 252, 401; 718/105; 709/208–211
See application file for complete search history.

(56) References Cited

U.S. PATENT DOCUMENTS 6,871,347 B2* 3/2005 Hay ........................... 718/105
6,987,763 B2* 1/2006 Rochberger et al. ......... 370/389
7,107,348 B2* 9/2006 Shimada et al. ............. 709/229
7,181,524 B1* 2/2007 Lele ........................... 709/226
7,233,575 B1* 6/2007 Jarvis ......................... 370/238
7,272,653 B2* 9/2007 Levy-Abegnoli et al. .... 709/229
2002/0095496 A1* 7/2002 Antes et al. ................. 709/225
2003/0140108 A1* 7/2003 Sampathkumar ............ 709/208
2004/0264481 A1* 12/2004 Darling et al. .............. 370/401
2007/0233809 A1* 10/2007 Brownell et al. ............ 709/218
2008/0126545 A1* 5/2008 Hopen et al. ................ 709/226

FOREIGN PATENT DOCUMENTS

JP 2002-164913 A 6/2002
JP 2003-517221 A 5/2003
JP 2003-518338 A 6/2003

OTHER PUBLICATIONS

T. Shimizu et al., "Proposal of redundancy and load balancing between gateways", Technical Report, Information Processing Society of Japan, Feb. 27, 2003, 2003-DPS-111, vol. 2003, No. 18, p.197-201.

* cited by examiner

*Primary Examiner*—Ricky Ngo
*Assistant Examiner*—Kan Yuen
(74) *Attorney, Agent, or Firm*—Sughrue Mion, PLLC

(57) ABSTRACT

Load balancing manager assigns to each cluster member a filter rule so as to divide traffic processing by a predetermined rule. According to the assigned rule, each cluster member obtains a packet multicast by a neighbor node, on a data link with the neighbor node. Each cluster member detects a session of the obtained packet to perform predetermined processing such as recording and updating of a state and application of a firewall packet filter.

18 Claims, 9 Drawing Sheets

COMMUNICATION PROCESSING SYSTEM, PACKET PROCESSING LOAD BALANCING DEVICE AND PACKET PROCESSING LOAD BALANCING METHOD THEREFOR

BACKGROUND OF THE INVENTION

1. Field of the Invention

The present invention relates to a communication processing system, a packet processing load balancing device and a packet processing load balancing method used therefor, and more particularly, an IP (Internet Protocol) packet processing load balancing method.

2. Description of the Related Art

Router devices placed on an IP network include a device which performs processing with reference to information of an IP higher layer. Among devices of this kind are, for example, a firewall device used in unauthorized access prevention or the like and a VPN (Virtual Private Network) gateway device which terminates IPsec (IP security protocol) tunnels.

These devices need to identify a session of an upper layer to which a passing packet belongs and process the packet according to a state of each session. Since these devices perform identification of a session and refer updating of a state every time a packet passes to increase the volume of computation required for processing, techniques have been developed to balance loads with a plurality of devices. Here, a session represents a virtual communication path provided by an upper layer of an IP, which includes a TCP (Transmission Control Protocol) connection, security association of IPsec and the like.

Conventional systems of balancing have such two kinds as described in the following. First is such a system as shown in FIG. 8, in which with a device which assigns packets (packet assignment device 5) placed preceding a plurality of packet processing devices [router devices (#1-#4) 4-1~4-$n$], the device assigns a packet to any of the packet processing devices to balance load.

Figure 8:
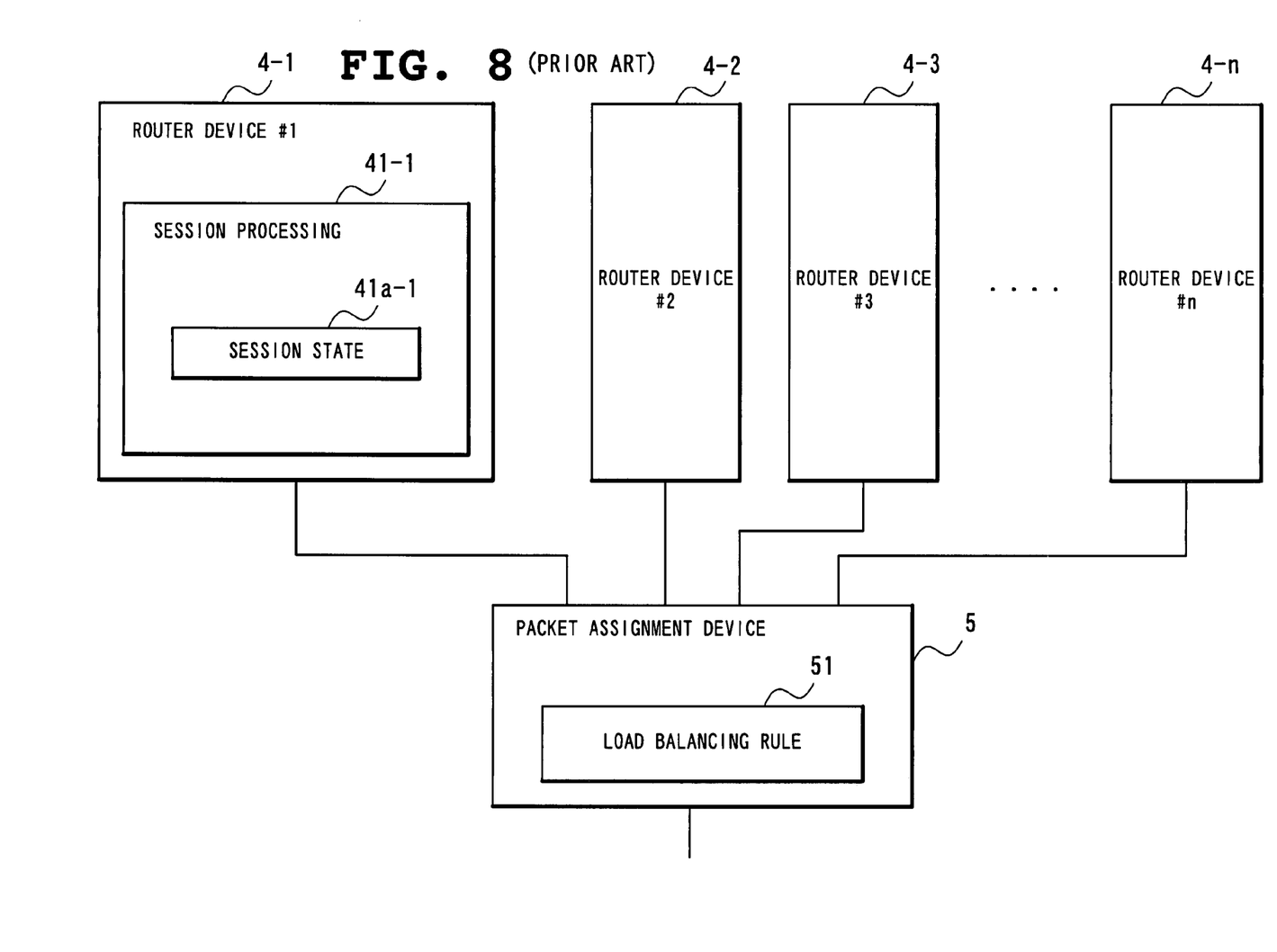
FIG. 8 is a block diagram showing an example of a structure of a conventional communication processing system.

In FIG. 8, the router devices (#1-#4) 4-1~4-$n$ have session processing functions 41-1~41-$n$ (the session processing functions 41-2~41-$n$ are not shown) of holding session states 41$a$-1~41$a$-$n$ (the session states 41$a$-2~41$a$-$n$ are not shown) and the packet assignment device 5 has a load balancing rule 51.

The first system has a shortcoming that processing is so centralized on a device which assigns packets that a failure of the device leads to paralysis of the entire system. For solving the problem, the second system which will be described in the following is proposed.

Figure 9:
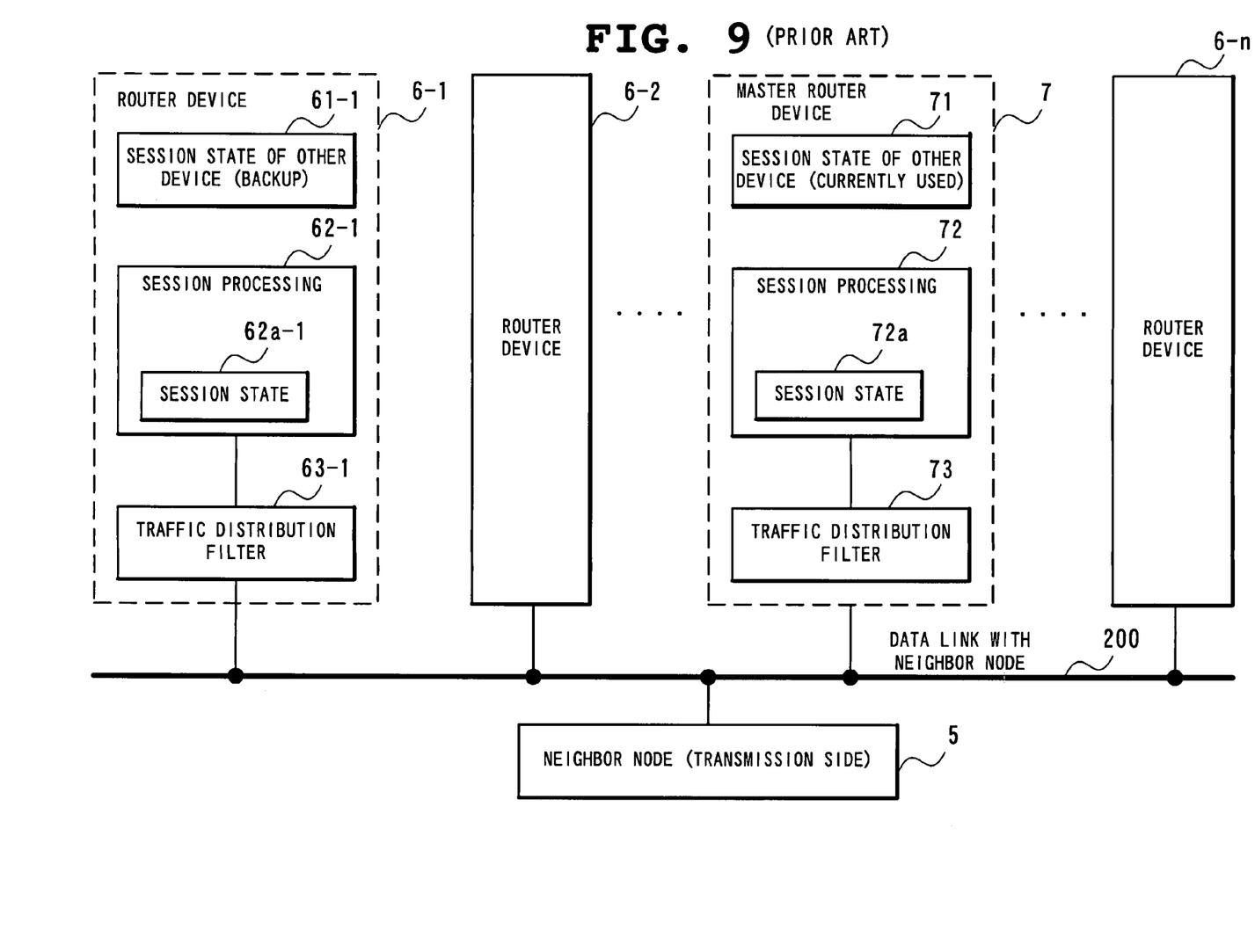
FIG. 9 is a block diagram showing another example of a structure of a conventional communication processing system.

In the second system, as illustrated in FIG. 9, packets arrive at all the packet processing devices (a master router device 7 and router devices 6-1~6-$n$) by multicast using a data link layer protocol. Each packet processing device includes a packet distribution filter [a traffic distribution filter 73 and traffic distribution filters 63-1~63-$n$ (the traffic distribution filters 63-2~63-$n$ are not shown)].

In FIG. 9, the master router device 7 has a session state (currently used) 71 of other device and a session processing function 72 of holding a session state 72$a$ and the router devices 6-1~6-$n$ have session states (backup) 61-1~61-$n$ of other devices [the session states (backup) 61-2~61-$n$ of other devices are not shown] and session processing functions 62-1~62-$n$ [the session processing functions 62-2~62-$n$ are not illustrated] of holding session states 62$a$-1~62$a$-$n$ (the session states 62$a$-2~62$a$-$n$ are not shown). The master router device 7 and the router devices 6-1~6-$n$ are connected to a neighbor node (transmission side) 5 through a data link 200 with a neighbor node.

The packet distribution filter passes or abandons an IP packet multicast on a data link according to load balancing rules. The load balancing rules are set at each device to satisfy the conditions (1) a packet of the similar contents is processed by any one of the devices and (2) a packet passes through a filter of any one of the devices without fail.

According to a load balancing procedure in the second system, such operation as described below is executed.

(1) The master device sets a load balancing rule at other device.

(2) The master device recognizes which load balancing filter is set at other device and sets a rule so as to balance loads evenly.

(3) The master device sets to itself such a load balancing filter that it processes a packet not relevant to a load balancing rule.

(4) Based on session information of a packet processed by the master device, a new load balancing rule is generated and set with respect to another device.

(5) When the master device develops a failure, other device operates to serve as the master device.

In FIG. 9, each device has the session processing function. In the session processing function, an internal session processing rule and a session state are referred to to process a packet having passed through the packet distribution filter and abandon or transfer the packet.

The master router device 7 sets a session processing rule to each device. The respective devices including the master router device 7, which exchange session states with each other, perform the exchange at fixed intervals when there exists a difference from the lastly exchanged state.

The respective devices including the master router device 7 hold a session processing rule of other device and a session state of each device as of a certain time point. Therefore, when any of tha other devices than the master router device 7 develops a failure, the master router device 7 determines a replacement device to make the device in question take over a session processing rule set at the device having the failure and a session state. When the master router device 7 develops a failure, other device takes over the function of the master router device. This arrangement enables automatic recovery from a failure of an arbitrary device. (Literature: Japanese Translation of PCT International Application No. 2003-518338, Japanese Translation of PCT International Application No. 2003-517221)

In the above-described conventional load balancing methods, however, other devices need to hold information necessary to operate as a master device in order to be prepared for a failure of the master device.

Since the master device needs to hold all the contents of sessions to be assigned to other devices, every device needs to hold information of the sessions assigned to all of the other devices. As a result, with the conventional load balancing methods, as the number of sessions to be processed by a cluster system increases, the volume of states to be held by each device is increased irrespective of the number of devices in the system.

Moreover, in the conventional load balancing methods, because the above-described states are synchronized with each other in the respective devices, when a master device newly assigns a session to other device, states of all the devices are updated. Therefore, with the conventional load balancing methods, shortening an interval of state synchronization in order to reduce a failover time at the time when the master device develops a failure (other device takes over control processing of the master device) results in increasing overhead in communication for updating of the states of the devices.

SUMMARY OF THE INVENTION

The object of the present invention is to solve the above-described problems and provide a communication processing system and a packet processing load balancing device which enables packet processing load balancing without increasing overhead in communication for updating all of the states which each device in the system should hold and for updating the state, and a packet processing load balancing method therefor.

The communication processing system according to the present invention includes a plurality of load balancing control devices which control load balancing of a group of router cluster devices operable as a router which transfers a packet, in which the plurality of load balancing control devices are placed separately from a packet processing device which processes the packet and when one of the plurality of load balancing control devices develops a failure, other load balancing control device takes over control processing of the device having the failure.

The packet processing load balancing device according to the present invention has a function of controlling load balancing of the group of router cluster devices operable as a router which transfers a packet and is placed separately from a packet processing device which processes the packet and when a currently used device which executes control processing for the packet processing device develops a failure, takes over control processing of the currently used device having the failure.

The packet processing load balancing method according to the present invention includes a step of controlling load balancing of a group of router cluster devices operable as a router which transfers a packet on the side of a plurality of load balancing control devices placed separately from a packet processing device which processes a packet, so that when one of the plurality of load balancing control devices develops a failure, other load balancing control device takes over control processing of the device having the failure.

More specifically, the packet processing load balancing method according to the present invention aims at controlling load balancing of a group of router cluster devices operable as a router which transfers an IP (Internet Protocol) packet, and with the plurality of control devices placed separately from the packet processing device, even when one control device develops a failure, by making other device take over control processing (failover), prevents IP router functions and a load balancing function from stopping at a time of a failure.

In addition, the packet processing load balancing method according to the present invention realizes cost-down in load balancing control by distributing processing of a passing packet over the respective devices according to a division rule which is statically determined irrespective of whether a packet passes or not.

Moreover, in the packet processing load balancing method according to the present invention, performing processing of the cluster system caused by a failure of a control device and failover only among the control devices prevents the router cluster from being involved in failover processing of the control device.

Here, the IP router cluster has the following functions of:

(A) with respect to other neighbor IP node, operating as one router which transfers an IP packet, (B) enhancing the entire performance by sharing packet transfer processing by the plurality of routers, and (C) by using upper layer header information such as TCP (Transmission Control Protocol) or the like, detecting a session to which a packet belongs, to record and update a state of the session, as well as performing predetermined processing according to the session state. Session represents a virtual communication path provided by an IP upper layer, which includes a TCP connection, security association of IPsec (IP security protocol) and the like.

With this arrangement, in the packet processing load balancing method according to the present invention, a backup manager holds the same information as that of a currently used manager to make the managers be more redundant. In addition, because the managers are placed separately from a cluster member, no processing of a cluster member is stopped due to a failure of a manager or no cluster-member needs to process an extra control signal, so that an effect on a cluster member exerted by a manager failure is reduced.

In addition, in the packet processing load balancing method according to the present invention, traffic division rules are assigned to each cluster member to eliminate the need of exchanging session information unless a cluster member is changed, resulting in reducing overhead in communication of control information for load balancing.

Moreover, in the packet processing load balancing method according to the present invention, when frequently transmitting an advertisement for monitoring activeness/inactiveness, a manger and each cluster member may be connected by a data link dedicated to a control signal.

As a result, the packet processing load balancing method according to the present invention enables packet processing load balancing without increasing overhead in communication for updating the volume of states to be held by each device in a system and updating a state.

Other objects, features and advantages of the present invention will become clear from the detailed description given herebelow.

BRIEF DESCRIPTION OF THE DRAWINGS

The present invention will be understood more fully from the detailed description given herein below and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to not obscure the present invention unnecessarily.

Figure 1:
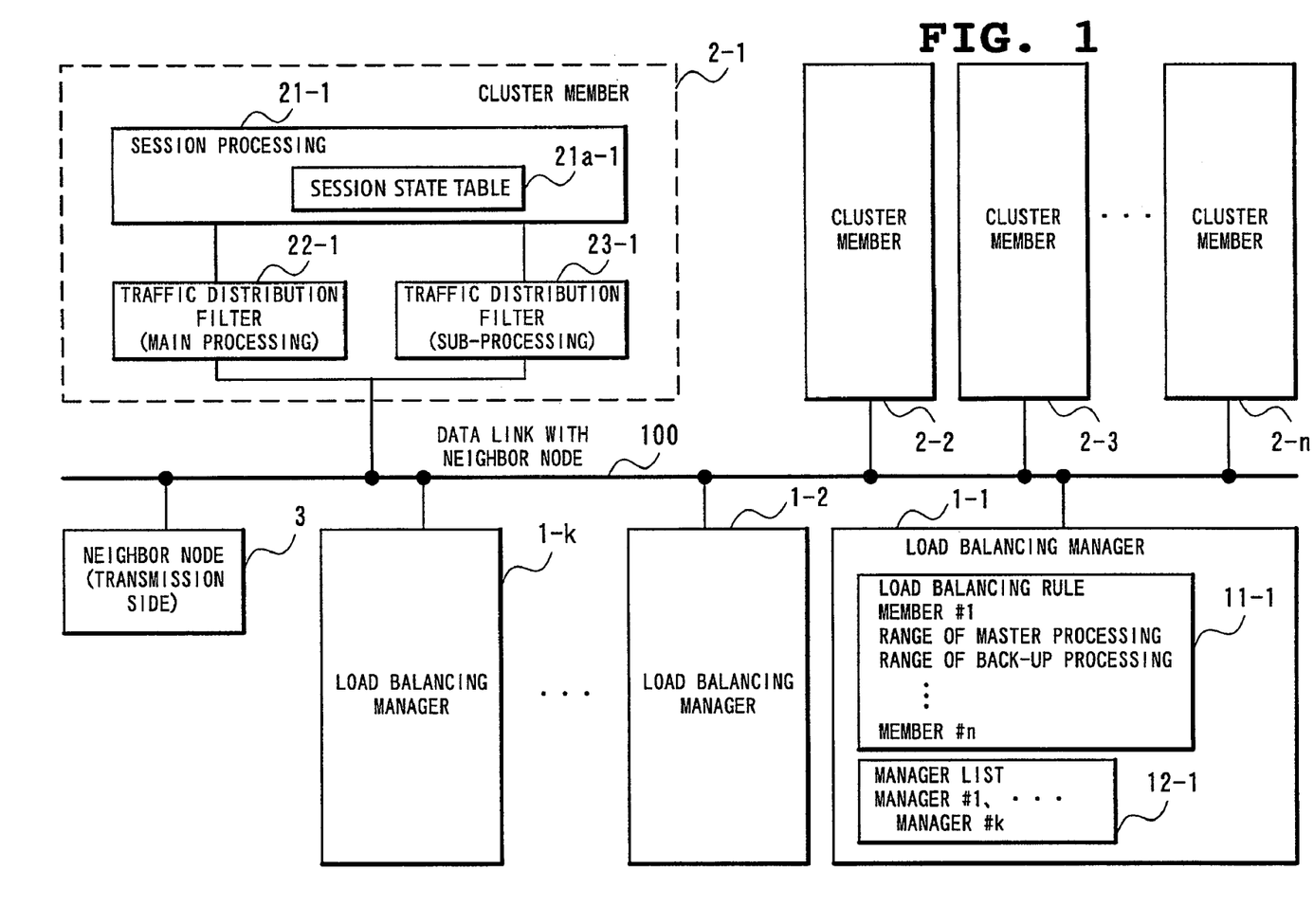
FIG. 1 is a block diagram showing a structure of a communication processing system according to one embodiment of the present invention.

Next, an embodiment of the present invention will be described with reference to the drawings. FIG. 1 is a block diagram showing a structure of a communication processing system according to one embodiment of the present invention. In FIG. 1, the communication processing system according to one embodiment of the present invention is an IP cluster system including load balancing managers 1-1~1-$k$, cluster members 2-1~2-$n$ and an neighbor node (transmission side) 3 which are connected through a data link 100 with the neighbor node.

More specifically, the cluster members 2-1~2-$n$ are each connected to the same data link (the data link 100 with the neighbor node) as that of the neighbor node (transmission side) 3. The load balancing managers 1-1~1-$k$ are connected on the data link (the data link 100 with the neighbor node) with any of the neighbor nodes (transmission side) 3.

The respective cluster members 2-1~2-$n$ include session processing functions 21-1~21-$n$ (the session processing functions 21-2~21-$n$ are not shown) holding session state tables 21$a$-1~21$a$-$n$ (the session state tables 21$a$-2~21$a$-$n$ are not shown), traffic distribution filters (main processing) 22-1~22-$n$ [the traffic distribution filters (main processing) 22-2~22-$n$ are not shown] and traffic distribution filters (sub-processing) 23-1~23-$n$ [the traffic distribution filters (sub-processing) 23-2~23-$n$ are not shown].

The load balancing managers 1-1~1-$k$ include a load balancing rule ([range of master processing of a member #1, range of backup processing], . . . , [range of master processing of a member #n, range of backup processing]) 11-1 and a manager list (manager #1, . . . , manager #k) 12-1.

The load balancing managers 1-1~1-$k$ assign filter rules to the respective cluster members 2-1~2-$n$ so as to divide traffic processing by predetermined rules. According to the assigned rules, the cluster members 2-1~2-$n$ obtain a packet multicast by the neighbor node 3 onto the data link 100 with the neighbor node.

Each of the cluster members 2-1~2-$n$ detects a session of the obtained packet to perform predetermined processing such as state recording and updating and application of a firewall packet filter. Here, the session represents a virtual communication path provided by an upper layer of an IP (Internet Protocol) and includes, for example, a TCP (Transmission Control Protocol) connection and IPsec (IP security protocol) security association.

The load balancing managers 1-1~1-$k$ can be placed in the plural. One of these load balancing managers 1-1~1-$k$ operates as a currently used manager and the remainder operates as a backup manager. A currently used load balancing manager assigns a traffic processing range to each of the cluster members 2-1~2-$n$ and instructs the same on processing based on a member list in the cluster.

The backup load balancing managers monitor whether the currently used load balancing manger is active or inactive and when the currently used load balancing manger develops a failure, one of these backup load balancing mangers serves as a currently used load balancing manger. This arrangement enables each of the cluster members 2-1~2-$n$ to perform processing without considering a failure and without considering a redundant structure of the load balancing managers 1-1~1-$k$.

Figure 2:
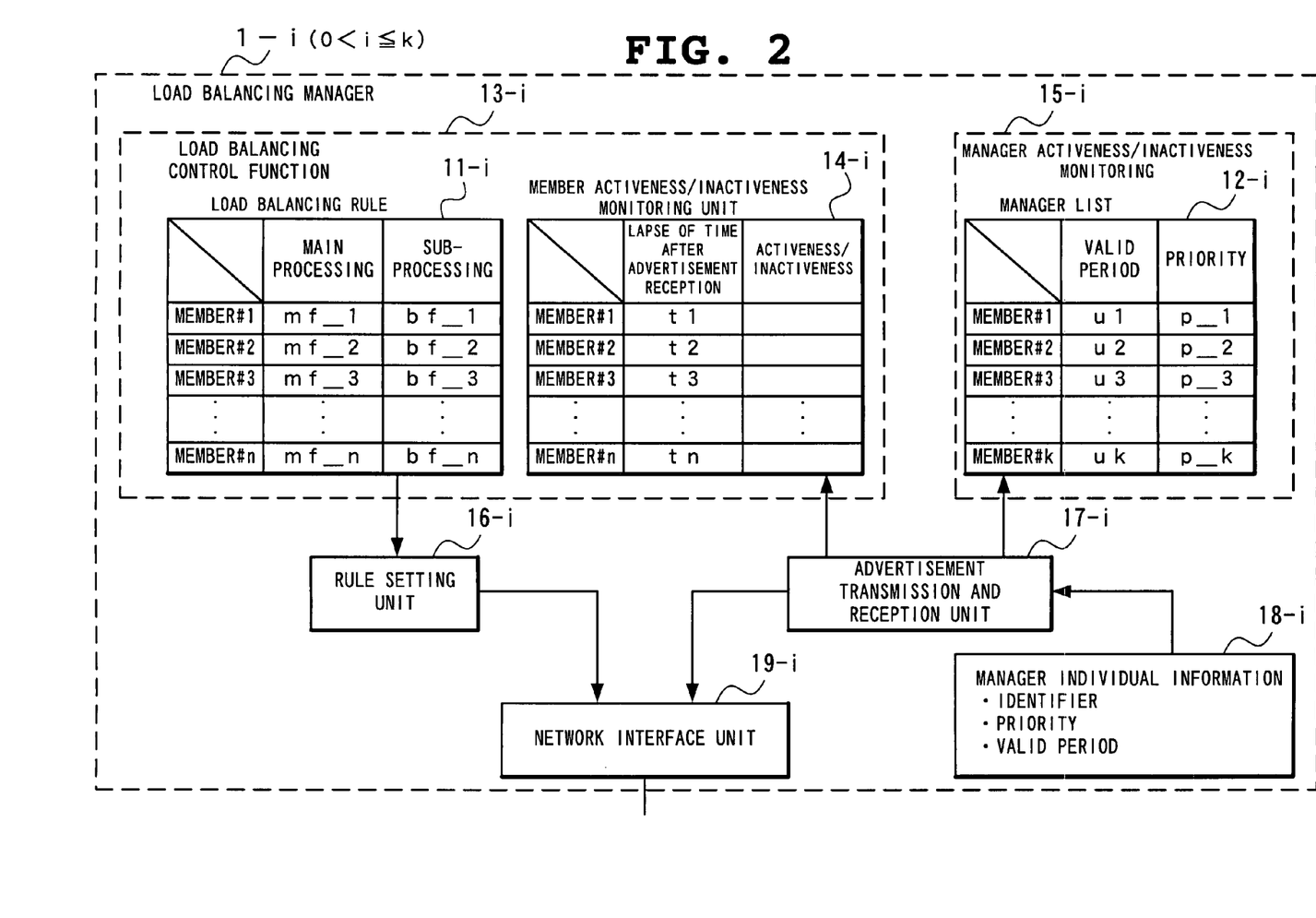
FIG. 2 is a block diagram showing a structure of a load balancing manager illustrated in FIG. 1.

FIG. 2 is a block diagram showing a structure of a load balancing manager 1-$i$ (0<$i$≦$k$). In FIG. 2, the load balancing manger 1-$i$ includes a load balancing control function 13-$i$, a manager activeness/inactiveness monitoring function 15-$i$, a load balancing rule setting unit 16-$i$, an advertisement transmission and reception unit 17-$i$, manger individual information 18-$i$ and a network interface unit 19-$i$.

The load balancing control function 13-$i$ includes a load balancing rule 11-$i$ and a member activeness/inactiveness monitoring function 14-$i$, and the manager activeness/inactiveness monitoring function 15-$i$ includes a manager list 12-$i$. The member activeness/inactiveness monitoring function 14-$i$ is made up of a lapse of time after advertisement reception (t1~tn) and activeness/inactiveness information for each of the cluster members 2-1~2-$n$ (members #1~#n), and the manager list 12-$i$ is made up of a valid period (u1~uk) and priority (p_1~p_k) for each of the load balancing managers 1-1~1-$k$ (managers #1~#n).

Set as individual parameters of the load balancing managers 1-1~1-$k$ are [manager identifier: to be set to be the sole manager in the cluster] [priority: to be set to be all put in order] and [valid period of manager advertisement].

The advertisement transmission and reception unit 17-$i$ is connected to the member activeness/inactiveness monitoring function 14-$i$ and the manager activeness/inactiveness monitoring function 15-$i$ to transmit an advertisement for notifying that its own device is active, as well as receiving an advertisement signal transmitted by the cluster members 2-1~2-$n$ and other load balancing managers to transmit the information to the member activeness/inactiveness monitoring function 14-$i$ and the manager activeness/inactiveness monitoring function 15-$i$. Based on an advertisement signal, the member activeness/inactiveness monitoring function 14-$i$ and the manager activeness/inactiveness monitoring function 15-$i$ manage an activeness/inactiveness state of a device as a transmission source of the signal.

The load balancing rule 11-$i$ manages a division rule of traffic to be processed by each of the cluster members 2-1~2-$n$ and a state of current division. In addition, the load balancing rule 11-$i$ is composed of a main load balancing rule (mf_1~mf_n) and a sub load balancing rule (bf_1~bf_n). The load balancing rule setting unit 16-$i$ is connected to the load balancing rule 11-$i$ and notifies each router device (not shown) of traffic assignment determined by the load balancing rule 11-$i$.

The advertisement transmission and reception unit 17-$i$ and the load balancing rule setting unit 16-$i$ are connected to the data link 100 with the neighbor node through the network interface unit 19-$i$. Stored in the manager individual information 18-$i$ are individual information about the load balancing manager 1-$i$ such as an identifier, priority and a valid period.

Figure 3:
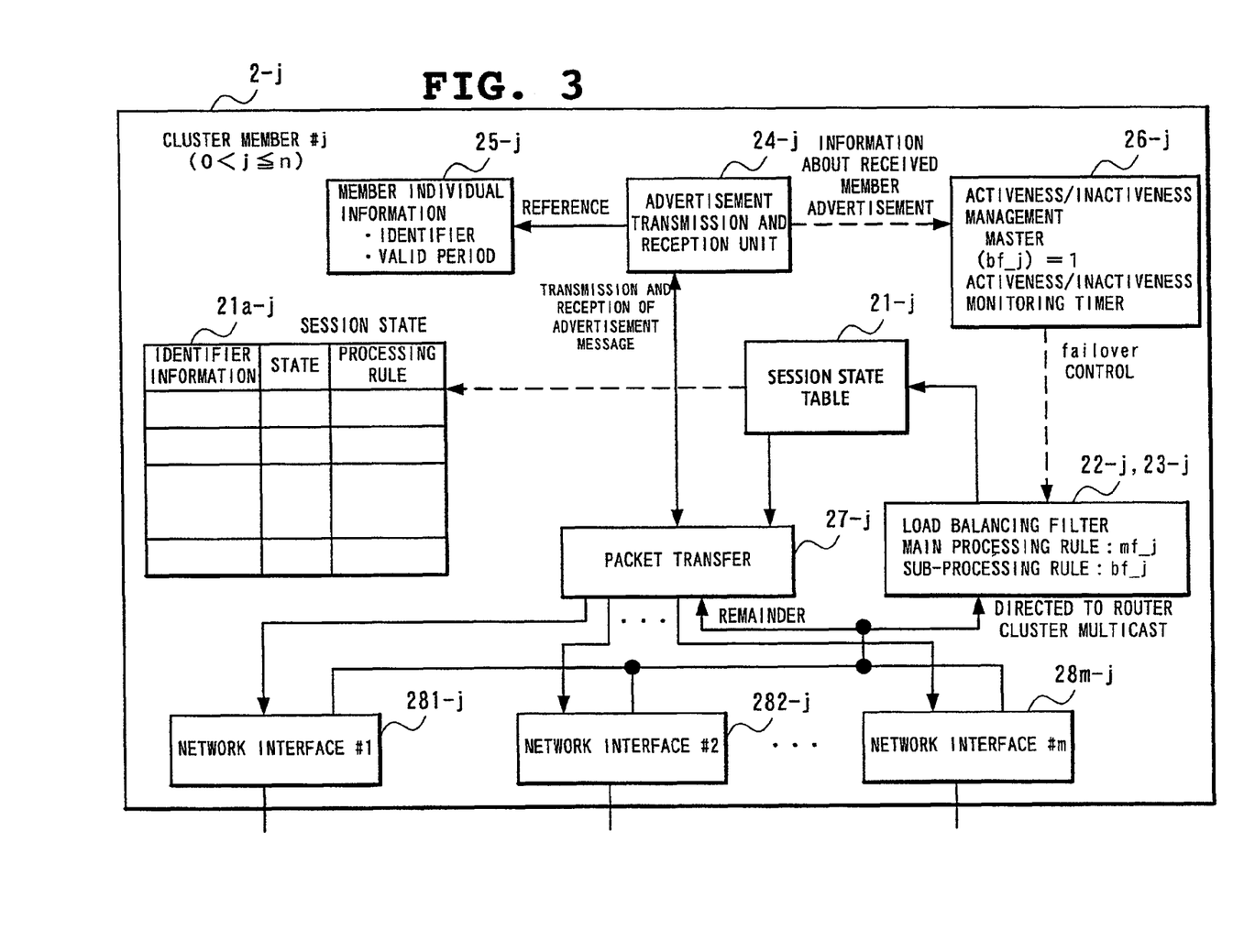
FIG. 3 is a block diagram showing a structure of a cluster member illustrated in FIG. 1.

FIG. 3 is a block diagram showing a structure of a cluster member 2-$j$ (0<$j$≦$n$). In FIG. 3, the cluster member 2-$j$ includes a session processing function 21-$j$, a session state table 21$a$-$j$, load balancing filters 22-$j$ & 23-$j$, an advertisement transmission and reception unit 24-$j$, member individual information 25-*j*, an activeness/inactiveness management function 26-*j*, a packet transfer function 27-*j* and network interfaces (#1~#m) 281-*j*~28*m*-*j*.

Set as individual parameters of each cluster member 2-*j* are [member identifier: to be set to be the sole member in the cluster] and [valid period of member advertisement].

The network interfaces (#1~#m) 281-*j*~28*m*-*j* are connected to the data link (the data link 100 with an neighbor node) which connects each router and the neighbor node. In the present embodiment, the data link needs to support multicast or broadcast.

The load balancing filters 22-*j* & 23-*j* have a main processing rule (mf_j) and a sub-processing rule (bf_j) to assign a packet to be processed by its own device from among packets received from the data link.

The session processing function 21-*j* performs processing according to a session to which each packet belongs. The session state table 21*a*-*j* holds a state of a session to which each packet belongs. Here, the session represents a virtual communication path provided by an upper layer of an IP (Internet Protocol), which includes, for example, a TCP (Transmission Control Protocol) connection and SA (Security Association) of an IPsec (IP security protocol).

The session state table 21*a*-*j* indicates inherent information held for each of these sessions and in a case of a TC connection, the information includes [connection state] [sequence number] [acknowledgement number], etc. In a case of IPsec SA, it includes an SA parameter determined by the RFC (Request for Comments) 2401.

The packet transfer function 27-*j* is a function of searching for preset path information with a destination of a packet as a key to determine a packet sending-out path and transferring the packet to a subsequent hop node.

The activeness/inactiveness management function 26-*j* is a function of notifying other cluster members and the load balancing managers of its own device information and detecting a failure of other cluster member, which is composed of an advertisement message transmission and reception function and an activeness/inactiveness monitoring timer.

Figure 4:
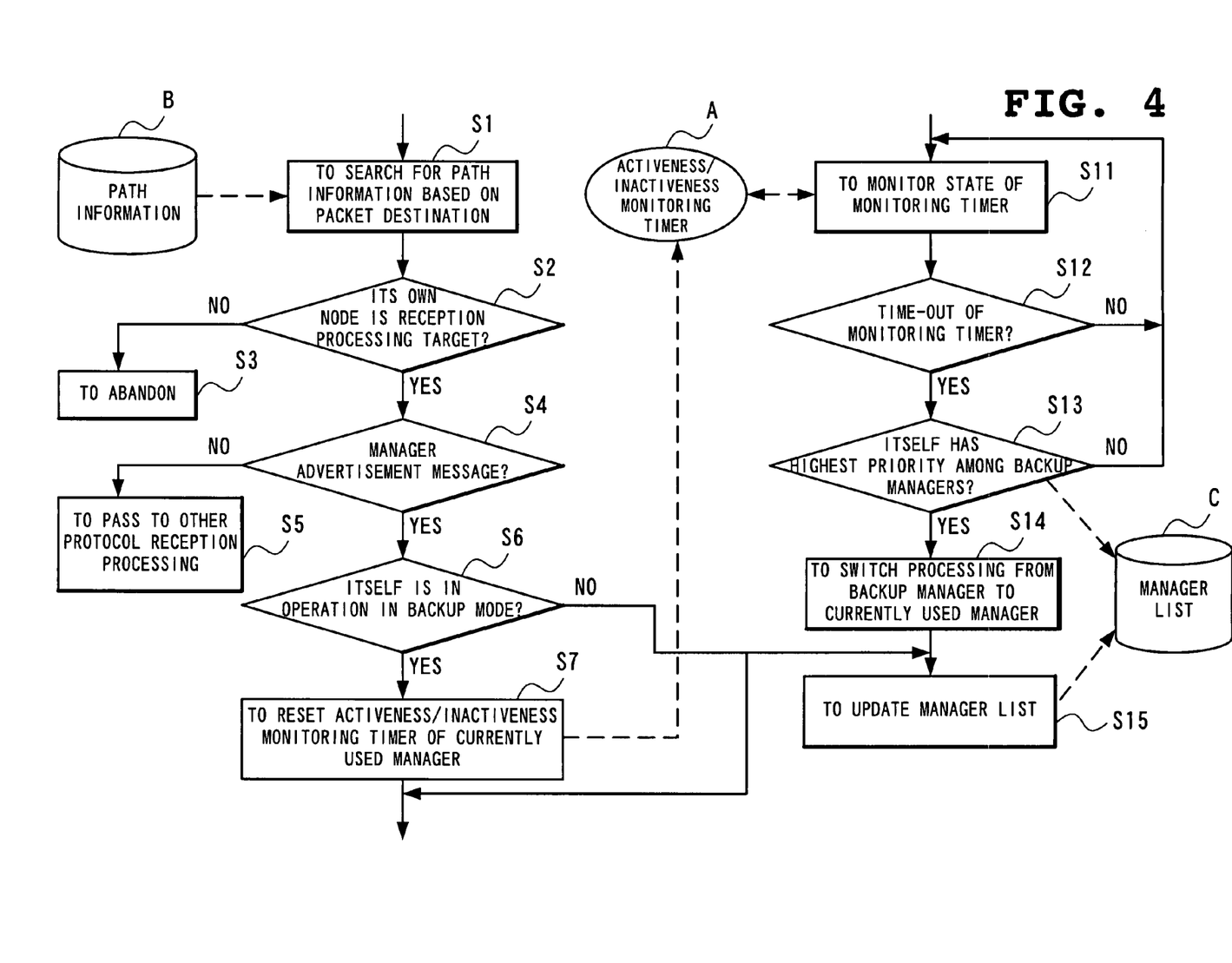
FIG. 4 is a flow chart showing an activeness/inactiveness•failover procedure performed among the load balancing managers illustrated in FIG. 1.
Figure 5:
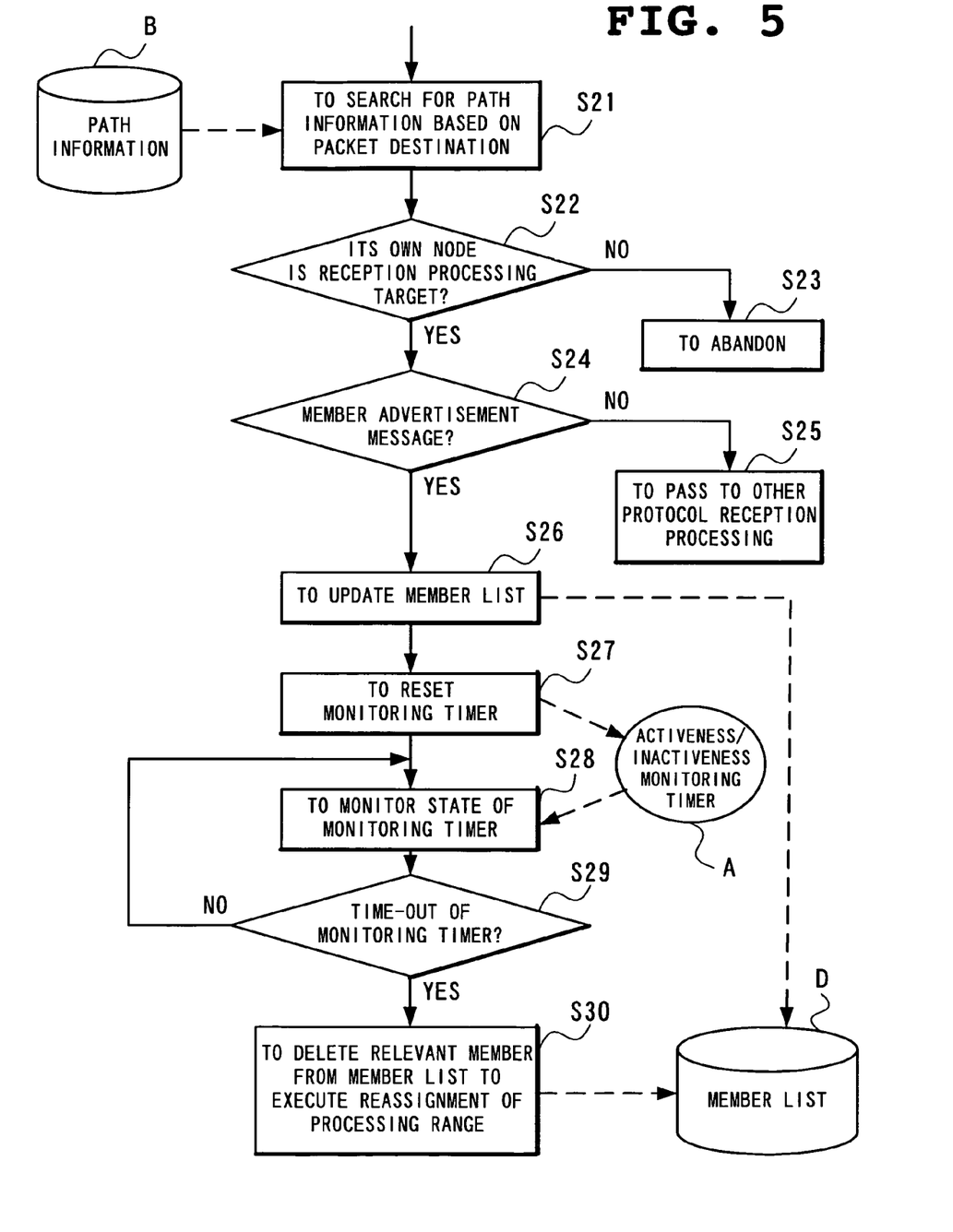
FIG. 5 is a flow chart showing a procedure of controlling load balancing of the cluster member by the load balancing managers illustrated in FIG. 1.
Figure 6:
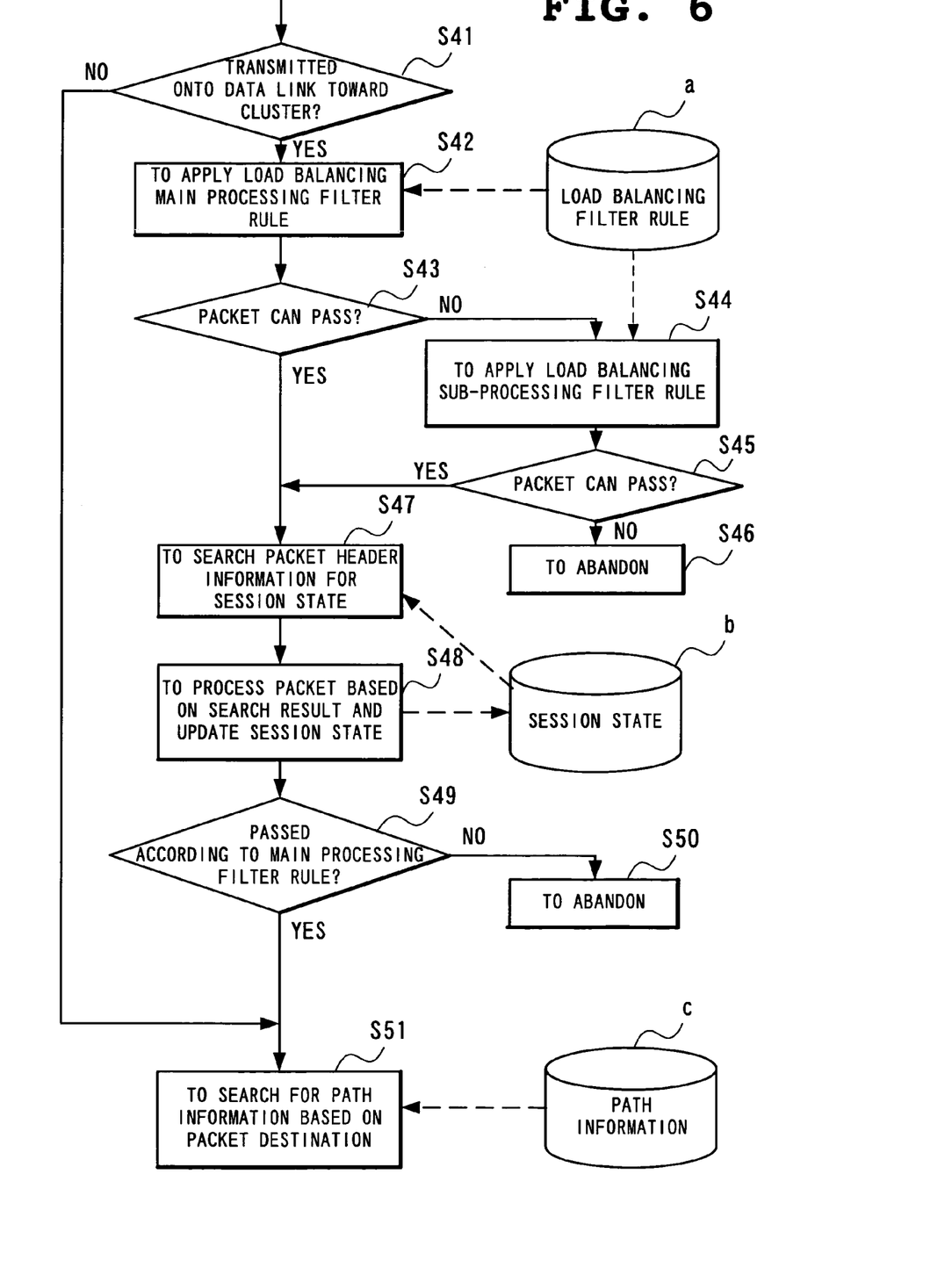
FIG. 6 is a flow chart showing a packet processing procedure of the cluster member illustrated in FIG. 1.
Figure 7:
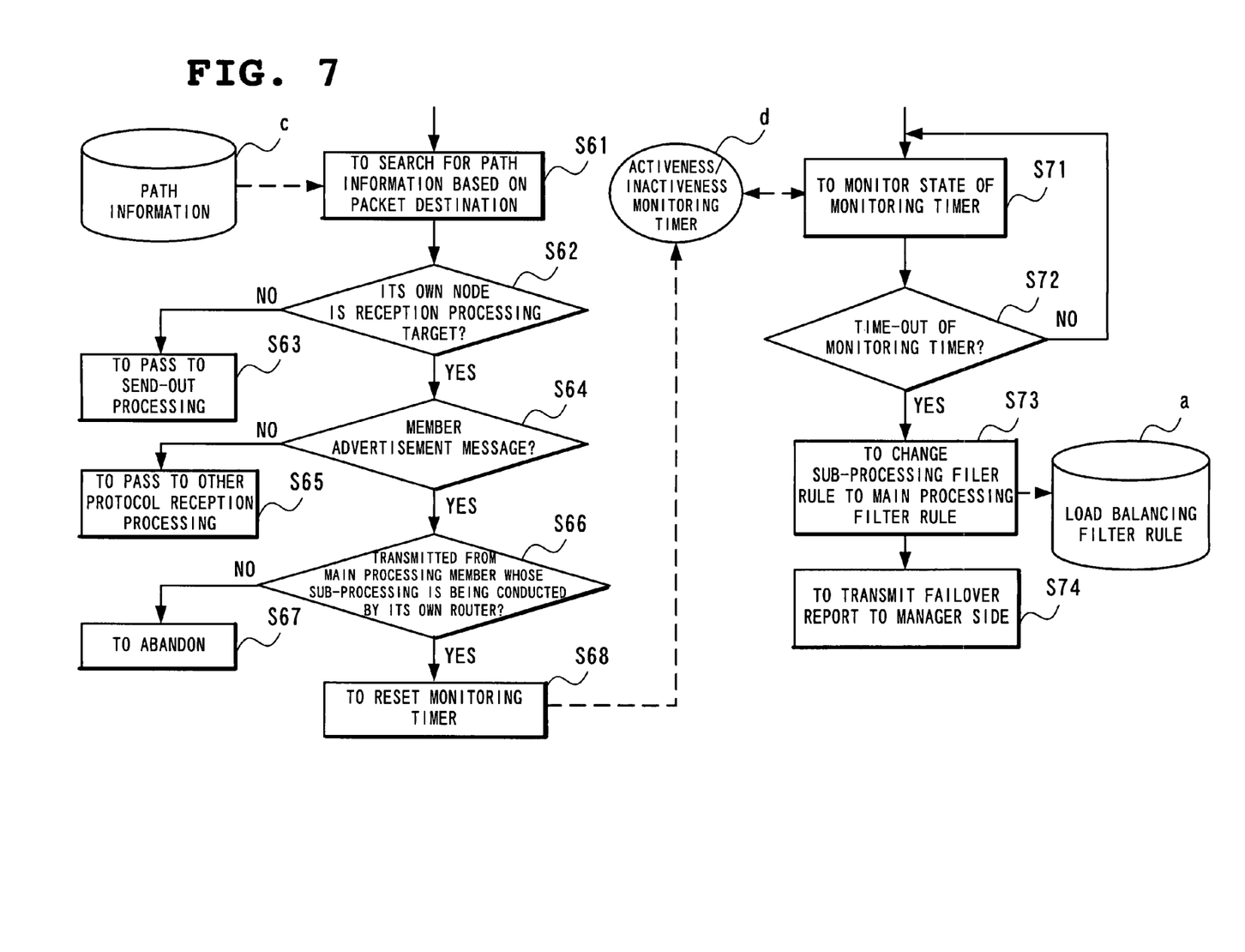
FIG. 7 is a flow chart showing an activeness/inactiveness•failover procedure of the cluster member illustrated in FIG. 1.

FIG. 4 is a flow chart showing an activeness/inactiveness monitoring•failover procedure performed among the load balancing managers 1-1~1-*k* illustrated in FIG. 1. FIG. 5 is a flow chart showing a procedure of controlling load balancing of the cluster members 2-1~2-*n* by the load balancing managers 1-1~1-*k* illustrated in FIG. 1. FIG. 6 is a flow chart showing a packet processing procedure of the cluster members 2-1~2-*n* illustrated in FIG. 1, and FIG. 7 is a flow chart showing an activeness/inactiveness monitoring•failover procedure of the cluster members 2-1~2-*n* illustrated in FIG. 1. With reference to FIGS. 1 to 7, operation of the communication processing system according to one embodiment of the present invention will be described. In the following, the description will be made with respect to the load balancing manager 1-*i* shown in FIG. 2 and the cluster member 2-*j* shown in FIG. 3.

Each load balancing manager 1-*i* obtains an identifier and information of other load balancing mangers existing in the cluster by receiving a manager advertisement which will be described later to control a redundant structure of the load balancing manager 1-*i*. Redundancy control of the load balancing manager 1-*i* is performed by the manager activeness/inactiveness monitoring function 15-*i* of the load balancing manager 1-*i*.

The manager monitoring function 15-*i* transmits, onto a predetermined interface, a manager advertisement including an identifier, priority and a valid period toward a predetermined destination. Manager advertisement is set to be received by all the load balancing managers 1-*i*.

Each load balancing manager 1-*i* generates the manager list 12-*i* based on the received manager advertisement. Each element of the manager list 12-*i* is erased from the list when a valid time period contained in the advertisement has elapsed and no new advertisement is received.

Among managers contained in the manager list 12-*i*, a state of a manager whose device has the highest priority is set to be [currently used]. Other managers set states of their own devices to be [backup].

The currently used manager performs load balancing control of the cluster member 2-*j* by a procedure which will be described later. When processing range assignment is updated due to a failure of the cluster member 2-*j* or the like, it notifies another manager of the updated assignment contents. The backup manager receives assignment of balancing processing from the currently used manager and holds the same.

Backup manager monitors activeness/inactiveness of a currently used manager by the procedure shown in FIG. 4. When the valid period of the manager advertisement expires to delete an element of the currently used manager from the manager list, among the backup managers registered in the list, a backup manager whose device has the highest priority will behave as a currently used manager.

More specifically, the backup manager searches for path information B based on a destination of a packet (Step S1 in FIG. 4) and when its own node is not a reception processing target (Step S2 in FIG. 4), abandons the packet (Step S3 in FIG. 4).

When its own node is a reception processing target (Step S2 in FIG. 4), the backup manager determines whether the packet is a manager advertisement message or not (Step S4 in FIG. 4). When the packet is not a manager advertisement message, the backup manager passes the packet to other protocol reception processing (Step S5 in FIG. 4).

When the packet is a manager advertisement message and its own device is in operation in a backup mode (Step S6 in FIG. 4), the backup manager resets an activeness/inactiveness monitoring timer A of the currently used manager (Step S7 in FIG. 4).

On the other hand, while monitoring the state of the activeness/inactiveness monitoring timer A (Step S11 in FIG. 4), when the activeness/inactiveness monitoring timer A counts up (Step S12 in FIG. 4), the backup manager, if its own device is a backup manager having the highest priority among the backup managers (Step S13 in FIG. 4), switches processing from the backup manager to the currently used manager (Step S14 in FIG. 4) to update a manager list C (Step S15 in FIG. 4).

Each cluster member 2-*j* propagates activeness of its own device to the load balancing manager 1-*i* and other cluster members by transmission of an advertisement. The advertisement is transmitted onto a predetermined interface toward a predetermined destination. The advertisement includes an identifier of a cluster member and a valid period of the advertisement. The advertisement is received by each cluster member and the currently used manager.

By receiving the above-described cluster member advertisement, the currently used manager obtains an identifier of a cluster member existing in the cluster to control traffic distribution. The load balancing control function 13-*i* includes a list of cluster members connected to the same data link.

Each element in the list of the cluster members includes a number indicative of a position in the list, an identifier, a valid period and information for calculating a filter rule corresponding to the relevant element. The cluster member list is structured to have member identifiers contained in advertisements aligned in numerical order.

The currently used manager calculates a range of traffic whose main processing should be performed by each cluster member based on the number of members contained in the generated cluster member list and a position of each member in the list.

Assume here that a calculation rule under which each processing range satisfies the following conditions is set in advance. More specifically, assume that the main processing range is a part of all the traffic to be processed by a router cluster and none of the respective ranges overlap with each other. With the whole of traffic as T and an empty set as q, a range of traffic whose main processing is taken charge of by each cluster member j ($0<j\leq n$) will be expressed as follows:

$$mf\_1 \cup mf\_2 \cup \ldots \cup mf\_n = T$$

$$mf\_\cap mf\_2 \cap \ldots \cap mf\_n = \phi$$

Apart from the main processing, each cluster member j ($0<j\leq n$) calculates a range bf_j of sub-processing so as to satisfy the following conditions:

$$bf\_1 \cup bf\_2 \cup \ldots \cup bf\_n = T$$

$$mf\_j \cap bf\_j = \phi,$$

in which ($0<j\leq n$) holds. Each cluster member j ($0<j\leq n$) transmits to each cluster member a notification of instructing that the above-described mf_j, bf_p_j should be processed.

In addition to assignment of the above-described sub-processing range, each cluster member j ($0<j\leq n$) includes an identifier of a cluster member in charge of the main processing of the same range into the instruction. More specifically, calculate and record l_p so as to have "master (bf_j)=1".

The currently used manager re-balances loads when the number of members in the router cluster is increased/decreased. As shown in the load balancing control function 13-*i* in FIG. 2, a predetermined valid period is set as an element in the list of the cluster members generated by the above-described procedure.

As shown in FIG. 5, the traffic distribution control function updates the list according to the above-described procedure based on an identifier contained in an advertisement received by a predetermined transmission and reception procedure. Simultaneously, a monitoring timer is reset for a relevant element at a predetermined valid period.

When another advertisement containing the same identifier as that of a cluster member which the relevant element includes is not received during the valid period after the last reception, delete the element from the list of the cluster members upon time-out of the monitoring timer.

More specifically, the currently used manager searches for the path information B based on a destination of a packet (Step S21 in FIG. 5) and when its own node is not a reception processing target (Step S22 in FIG. 5), abandons the packet (Step S23 in FIG. 5).

When its own node is a reception processing target (Step S22 in FIG. 5), the currently used manager determines whether the packet is a member advertisement message or not (Step S24 in FIG. 5). When the packet is not a member advertisement message, the currently used manager passes the packet to other protocol reception processing (Step S25 in FIG. 5). When the packet is a member advertisement message, the currently used manager updates a member list D (Step S26 in FIG. 5).

Subsequently, the currently used manager resets the activeness/inactiveness monitoring timer A (Step S27 in FIG. 5) to proceed to processing of monitoring a state of the activeness/inactiveness monitoring timer A (Step S28 in FIG. 5). When the activeness/inactiveness monitoring timer A counts up (Step S29 in FIG. 5), the currently used manager deletes a relevant member from the member list D to execute re-assignment of a processing range (Step S30 in FIG. 5).

When an element in the list of the cluster members is changed to change a range of traffic to be processed by any of the cluster members by this procedure, such as a case where an element is deleted from the list of the cluster members, or in a case where a new cluster member is added, the currently used manager transmits an instruction on re-assignment of a processing range to each cluster member.

When in a certain cluster member, due to change of traffic processing assignment by this procedure, traffic whose session state is held by the member itself goes out of a filter range, set the filter so as to receive traffic within the range whose session state is held. In the traffic within the range, no traffic of a newly set up session will be accepted.

In addition, the cluster member reports the relevant session information and state to the currently used manager. The currently used manager copies the relevant session state onto a router device which assigns a range of traffic within the range including the session.

Processing of an IP packet sent from the neighbor node 3 with a router cluster as a subsequent hop will be described with reference to FIG. 6. Packet with an IP address for a router cluster used as a subsequent hop will be transmitted to a predetermined multicast address on the data link.

The multicast packet is set to be receivable by all the cluster members. Packet received with a data link address other than the predetermined multicast address as a destination will be processed separately with reference to path information.

The cluster member subjects the multicast packet to the above-described load balancing filters 22-*j*&23-*j* set by the currently used manager. At the load balancing filters 22-*j* & 23-*j*, only with respect to a router through which the packet is allowed to pass by the main processing filter or the sub-processing filter, the packet is passed to the session processing function 21-*j*. The other packets will be abandoned.

With respect to the packet having passed through the load balancing filters 22-*j*&23-*j*, the session state table 21*a*-*j* is referred to based on its header information to identify a relevant session. Packet whose session can not be identified will be processed according to a default processing rule.

With respect to a packet whose session has been identified, a state of the session is referred to, to perform packet processing and update the session state based on the relevant state and a predetermined processing rule.

Among packets not abandoned by the session processing, a packet having passed through the traffic distribution filter (main processing) 22-*j* will be passed over to the packet transfer function 27-*j*. Packet having passed through the traffic distribution filter (sub-processing) 23-*j* will be abandoned without being transferred.

The packet transfer function 27-*j* searches for path information c to pass a packet directed to its own member to reception processing and the remaining packets will be sent out through an interface at the sending-out side which is determined by the path information c.

More specifically, when a packet is transmitted onto the data link toward a cluster (Step S41 in FIG. 6), the cluster member 2-*j* applies a load balancing main processing filter rule out of a load balancing filter rule a (Step S42 in FIG. 6). On the other hand, when a packet is not one which is transmitted onto the data link toward a cluster (Step S41 in FIG. 6), the cluster member 2-*j* searches for the path information c based on the packet destination (Step S51 in FIG. 6) to send the packet out through the interface at the sending-out side which is determined by the path information c.

When finding that the packet can not pass as a result of application of the load balancing main processing filter rule (Step S43 in FIG. 6), the cluster member 2-*j* applies a load balancing sub-processing filter rule (Step S44 in FIG. 6). At that time, when finding that the packet can not pass as a result of application of the load balancing sub-processing filter rule (Step S45 in FIG. 6), the cluster member 2-*j* abandons the packet (Step S46 in FIG. 6).

When the packet is allowed to pass by applying the load balancing main processing filter rule (Step S43 in FIG. 6), or when the packet is allowed to pass by applying the load balancing sub-processing filter rule (Step S45 in FIG. 6), the cluster member 2-*j* searches header information of the packet for a session state (Step S47 in FIG. 6).

Based on the search result, the cluster member 2-*j* processes the packet to update a session state table b (Step S48 in FIG. 6). The cluster member 2-*j* abandons the packet (Step S50 in FIG. 6) unless the packet has passed according to the main processing filter rule (Step S49 in FIG. 6).

When the packet has passed according to the main processing filter rule (Step S49 in FIG. 6), the cluster member 2-*j* searches for the path information c based on the packet destination (Step S51 in FIG. 6) to send out the packet through the interface at the sending-out side which is determined by the path information c.

Each cluster member performs failover processing at the time of a failure of a main processing member in a manner as illustrated in FIG. 7. As shown in FIG. 7, the activeness/inactiveness monitoring function 26-*j* of the cluster member 2-*j*, in a case where within a range where its own device assigned by the load balancing manager 1-*i* is in charge of the sub-processing, an identifier contained in an advertisement received by the predetermined transmission and reception procedure is the same as an identifier of a cluster member performing the main processing, resets the activeness/inactiveness monitoring timer of the relevant cluster member.

After a lapse of a predetermined time after the last reception of the above-described advertisement, upon time-out of the activeness/inactiveness monitoring timer, the activeness/inactiveness monitoring function 26-*j*, considering that a cluster member as a transmission source of the relevant advertisement develops a failure, changes the sub-processing rule of the traffic distribution filter of its own device to the main processing rule.

Cluster member performing the sub-processing is allowed to hold, in a node, the same session state as that of a cluster member performing the main processing. Therefore, if the sub-processing node behaves as a main processing node since when the main processing node develops a failure, none of the effects caused by switching of the main processing node will be exerted on the outside of the cluster.

When the failover processing makes the cluster member in charge of the sub-processing perform the main processing, there will remain any cluster member which will perform the sub-processing in the relevant range due to lack in the sub-processing range. The load balancing manager again sets a balancing rule so as to fill in the lacking sub-processing range. After the failover processing, the cluster member having performed the failover processing reports the contents of the load balancing filter as of after the switching to the currently used manager so as to conduct the above-described operation immediately.

More specifically, the cluster member searches for the path information c based on a packet destination (Step S61 in FIG. 7) and when its own node is not a reception processing target (Step S62 in FIG. 7), passes the packet to send-out processing (Step S63 in FIG. 7).

On the other hand, when its own node is a reception processing target (Step S62 in FIG. 7) and the packet is not a member advertisement message (Step S64 in FIG. 7), the cluster member passes the packet to other protocol reception processing (Step S65 in FIG. 7).

When the packet is a member advertisement message (Step S64 in FIG. 7) and is not transmitted from a main processing member whose sub-processing is being performed by its own router (Step S66 in FIG. 7), the cluster member abandons the packet (Step S67 in FIG. 7). When the packet is one transmitted from the main processing member whose sub-processing is being performed by its own router (Step S66 in FIG. 7), the cluster member resets an activeness/inactiveness monitoring timer d (Step S68 in FIG. 7).

In addition, the cluster member monitors the state of the activeness/inactiveness monitoring timer d (Step S71 in FIG. 7) and when the activeness/inactiveness monitoring timer d counts up (Step S72 in FIG. 7), changes the sub-processing filter rule to the main processing filter rule in the load balancing filter rule a (Step S73 in FIG. 7) to transmit a failover report to the manager side (Step S74 in FIG. 7).

After receiving the failover report, the currently used manager again sets a load balancing rule so as to fill the sub-processing range by a predetermined procedure. In a case where the currently used manager has already detected a failure of a main processing member at the time of reception of the report, no processing for filling the sub-processing range will be performed because the relevant lacking range can be filled by re-balancing of loads.

Thus, according to the present embodiment, a backup manager holds the same information as that of a currently used manager to realize redundancy and the load balancing managers 1-1~1-*k* are separated from the cluster members 2-1~2-*n* to prevent the cluster members 2-1~2-*n* from stopping processing or prevent the need of processing an extra control signal due to a failure of a load balancing manager, so that effects on the cluster members 2-1~2-*n* exerted by a failure of the load balancing manager can be mitigated.

In addition, in the present embodiment, since assigning a division rule of traffic to the respective cluster members 2-1~2-*n* in advance eliminates the need of exchange of session information at other time than the time of changing the cluster members 2-1~2-*n*, overhead in communication of control information for the purpose of load balancing can be reduced.

In the present embodiment, when transmitting an advertisement for monitoring activeness/inactiveness frequently, the load balancing managers 1-1~1-*k* and the respective cluster members 2-1~2-*n* may be connected by a data link dedicated to a control signal.

Each function of the load balancing manager according to the above-described embodiment can be realized not only as hardware but also as software which realizes the function executed by each of these components. In this case, on a computer device which realizes the load balancing manager, a computer program (load balancing control program) which provides the above-described control function is executed.

Having such arrangement and operation as described above, the communication processing system and the packet processing load balancing device according to the present invention obtain the effect of balancing loads on packet processing without increasing overhead in communication for updating a volume of state that each device in the system should hold and updating a state.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

The invention claimed is:

1. A communication processing system comprising:
   a packet processing device comprising a plurality of router cluster devices operable as a router which processes a multicast packet, and
   a plurality of load balancing control devices which control load balancing of the plurality of router cluster devices;
   wherein said plurality of load balancing control devices are placed remote from said packet processing device;
   wherein when any of said plurality of load balancing control devices develops a failure, other load balancing control devices that have not failed take over control processing of the device having the failure,
   wherein each of the plurality of router cluster devices comprises
   a main processing filter which applies a main processing filter rule to the multicast packet, and
   a sub-processing filter which applies a sub-processing filter rule to the multicast packet if the multicast packet did not pass the main processing filter, and
   a session processing unit which performs processing according to a session to which the multicast packet belongs,
   wherein the multicast packet is abandoned after being processed by the session processing unit if the sub-processing filter rule was applied to the multicast packet and the multicast packet passed the sub-processing filter, and
   wherein at least one of said plurality of load balancing devices distributes processing of the multicast packet to each of the plurality of router cluster devices of said packet processing device according to a division rule determining which of the plurality of router cluster devices performs a main processing or a sub processing of the multicast packet.

2. The communication processing system as set forth in claim 1, wherein among said plurality of load balancing control devices, notification of said failure and processing of taking over said control processing due to the failure are performed.

3. The communication processing system as set forth in claim 1, wherein
   at least one of said plurality of load balancing control devices distributes processing of the multicast packet to each of the plurality of router cluster devices of said packet processing device according to a division rule determining which of the plurality of router cluster devices performs a main processing or a sub processing of the multicast packet, and
   among said plurality of load balancing control devices, notification of said failure and processing of taking over said control processing due to the failure are performed.

4. The communication processing system as set forth in claim 1, wherein
   in said plurality of load balancing control devices, each load balancing control device operable as a backup device holds information about said control processing of a load balancing control device operable as a currently used device to perform processing for making said load balancing control device operable as the currently used device redundant.

5. The communication processing system as set forth in claim 1, wherein said multicast packet is an IP packet.

6. A packet processing load balancing device comprising:
   a control device configured to control load balancing of a packet processing device comprising a plurality of router cluster devices operable as a router which processes a multicast packet, wherein
   the control device is placed remote from packet processing device which processes said multicast packet;
   the control device takes over control processing of one of the plurality of router cluster devices being currently used when a currently used router cluster device, which executes control processing with respect to said packet processing device, develops a failure,
   wherein each of the plurality of router cluster devices comprises
   a main processing filter which applies a main processing filter rule to the multicast packet, and
   a sub-processing filter which applies a sub-processing filter rule to the multicast packet if the multicast packet did not pass the main processing filter, and
   a session processing unit which performs processing according to a session to which the multicast packet belongs,
   wherein the multicast packet is abandoned after being processed by the session processing unit if the sub-processing filter rule was applied to the multicast packet and the multicast packet passed the sub-processing filter, and
   wherein the control device distributes processing of the multicast packet to each of the plurality of router cluster devices of said packet processing device according to a division rule determining which of the plurality of router cluster devices performs a main processing or a sub processing of the multicast packet.

7. The packet processing load balancing device as set forth in claim 6, which
   performs notification of said failure and control for taking over said control processing due to the failure with other packet processing load balancing devices.

8. The packet processing load balancing device as set forth in claim 6, which
   distributes processing of the multicast packet to each of the plurality of router cluster devices of said packet processing device according to a division rule determining which of the plurality of router cluster devices performs a main processing or a sub processing of the multicast packet, and
   performs notification of said failure and control for taking over said control processing, due to the failure with other control devices.

9. The packet processing load balancing device as set forth in claim 6, which
   holds information about said control processing of said currently used router cluster device at the time of operating as a backup.

10. The packet processing load balancing device as set forth in claim 6, wherein said multicast packet is an IP packet.

11. A packet processing load balancing method comprising:

controlling load balancing of a packet processing device comprising a plurality of router cluster devices operable as a router which processes a multicast packet, in a plurality of load balancing control devices placed remote from the packet processing device which processes the multicast packet; and controlling processing of the plurality of load balancing control devices when one of the plurality of load balancing control devices develops a failure, wherein each of the plurality of router cluster devices comprises a main processing filter which applies a main processing filter rule to the multicast packet, and a sub-processing filter which applies a sub-processing filter rule to the multicast packet if the multicast packet did not pass the main processing filter, and a session processing unit which performs processing according to a session to which the multicast packet belongs, wherein the multicast packet is abandoned after being processed by the session processing unit if the sub-processing filter rule was applied to the multicast packet and the multicast packet passed the sub-processing filter, and the method further comprising:

distributing processing of the multicast packet to each of the plurality of router cluster devices of said packet processing device according to a division rule determining which of the plurality of router cluster devices performs a main processing or a sub processing of the multicast packet.

12. The packet processing load balancing method as set forth in claim 11, further comprising a step of performing notification of said failure and taking-over of said control processing due to the failure among said plurality of load balancing control devices.

13. The packet processing load balancing method as set forth in claim 11, the method further comprising:

distributing processing of the multicast packet to each of the plurality of router cluster devices of said packet processing device according to a division rule determining which of the plurality of router cluster devices performs a main processing or a sub processing of the multicast packet; and performing notification of said failure and taking-over of said control processing due to the failure among said plurality of load balancing control devices.

14. The packet processing load balancing method as set forth in claim 11, the method further comprising making said load balancing control device redundant by holding, in each of the plurality of load balancing control devices each of which being operable as a backup device, information about said control processing of a load balancing control device operable as a currently used device.

15. The packet processing load balancing method as set forth in claim 11, wherein said multicast packet is an IP packet.

16. A computer-readable storage device storing a load balancing control program in a communication system, comprising the functions of:

making a plurality of load balancing control devices, placed remote from a packet processing device comprising a plurality of router cluster devices operable as a router which processes a multicast packet, execute a function of controlling load balancing of a packet processing device comprising a plurality of router cluster devices operable as a router which processes a multicast packet; and making, when any of said plurality of load balancing control devices develops a failure, other load balancing control device take over control processing of the device having the failure, wherein each of the plurality of router cluster devices comprises a main processing filter which applies a main processing filter rule to the multicast packet, and a sub-processing filter which applies a sub-processing filter rule to the multicast packet if the multicast packet did not pass the main processing filter, and a session processing unit which performs processing according to a session to which the multicast packet belongs, wherein the multicast packet is abandoned after being processed by the session processing unit if the sub-processing filter rule was applied to the multicast packet and the multicast packet passed the sub-processing filter, and wherein at least one of said plurality of load balancing devices distributes processing of the multicast packet to each of the plurality of router cluster devices of said packet processing device according to a division rule determining which of the plurality of router cluster devices performs a main processing or a sub processing of the multicast packet.

17. The computer-readable storage device storing a load balancing control program as set forth in claim 16, which executes a function, in said load balancing control device, of distributing processing of the multicast packet to each of the plurality of router devices of said packet processing device according to a division rule determining which of the plurality of router cluster devices performs a main processing or a sub processing of the multicast packet.

18. The computer-readable storage device storing a load balancing control program as set forth in claim 16, which executes a function of performing notification of said failure and taking-over of said control processing due to the failure among said plurality of load balancing control devices.

* * * * *